United States Patent [19]

Quick

[11] 4,365,413
[45] Dec. 28, 1982

[54] FAUCET STEM NUT SPLITTER

[76] Inventor: Thomas R. Quick, 2640 SW. 61, Oklahoma City, Okla. 73159

[21] Appl. No.: 219,029

[22] Filed: Dec. 22, 1980

[51] Int. Cl.³ .............................................. B26B 7/00
[52] U.S. Cl. ................................. 30/272 R; 29/426.4; 83/631
[58] Field of Search ........................ 30/272, 361, 165; 29/426.4, 264; 83/631

[56] References Cited

U.S. PATENT DOCUMENTS

| | | | |
|---|---|---|---|
| 247,407 | 9/1881 | Ramsey | 83/631 |
| 1,373,017 | 3/1921 | Nichols | 83/631 X |
| 2,221,904 | 11/1940 | Abramson et al. | 30/360 |
| 4,203,211 | 5/1980 | Quick | 30/272 |

Primary Examiner—Frank T. Yost
Attorney, Agent, or Firm—Robert K. Rhea

[57] ABSTRACT

An elongated sleeve surrounds and threadedly engages the depending end portion of a faucet stem having a nut securing it to a sink or basin. A pressure plate, having a bore loosely surrounding the faucet stem, is journalled by the end of the sleeve adjacent the faucet nut and is provided with radially disposed chisel cutters projecting toward the faucet nut. The cutters are moved into splitting engagement with the faucet nut by manual angular rotation of the sleeve relative to the faucet stem.

2 Claims, 3 Drawing Figures

FAUCET STEM NUT SPLITTER

BACKGROUND OF THE INVENTION

1. Field of the invention.

The present invention relates to plumbing tools and more particularly to a tool for removing faucet stem nuts.

Most faucets are provided with externally threaded tubular stems, projecting downwardly through a sink or basin flange, which are coaxially connected with the water supply line. The faucet stem is normally provided with a nut which bears against the depending surface of a sink or basin flange for holding the faucet firmly in place. When it is necessary to remove the old faucet for installing a new one it is difficult to remove the faucet nut on account of the limited space between the building wall and the adjacent generally vertical surface defining the bowl of the sink or basin. These faucet nuts and faucet stems on older installations are usually corroded as with rust or calcium deposits in the area of the nut and often cannot be removed by using conventional wrenches or other tools and as a result the faucet nut must be chiseled off which is also difficult and time consuming on account of the limited space.

2. Description of the prior art.

The most pertinent prior patent is believed to by my U.S. Pat. No. 4,203,211 which, in part, describes, but does not claim, the tool of this invention.

The principal distinction between this invention and the tool briefly described in this patent is the manner in which the thrust bearing and cutter blades is supported relative to the faucet stem engaging sleeve.

SUMMARY OF THE INVENTION

An elongated sleeve having an annular outstanding flange adjacent one end is provided with internal threads for coaxial threaded engagement with the depending end portion of a tubular faucet stem having a faucet nut securing the faucet stem and faucet to a sink or basin. A centrally bored cup-like member overlies and coaxially surrounds the annular flange and a thrust bearing seated on the flange permitting angular rotation of the sleeve relative to the cup member. The cup-like member is provided with radially disposed cutter blades facing toward the faucet nut. A wrench or wrench extension socket is formed in the end portion of the sleeve opposite the flange for angularly rotating the sleeve relative to the faucet stem.

The principal object of this invention is to provide a socket wrench operated tool which may be coaxially connected with a faucet stem and rotated relative to the faucet stem to engage and split a faucet nut for its removal.

DESCRIPTION OF THE PREFERRED EMBODIMENTS

Figure 1:
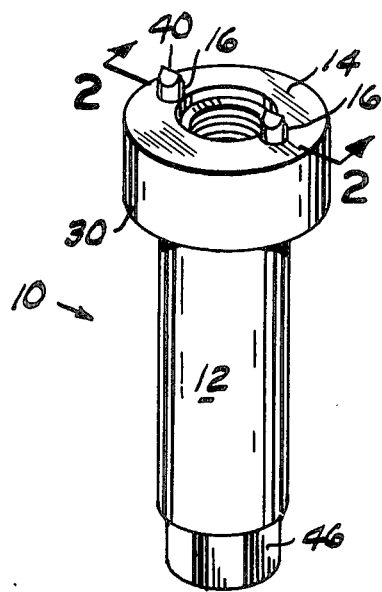
FIG. 1 is a perspective view of the tool.

Like characters of reference designate like parts in those figures of the drawings in which they occur.

In the drawings:

The reference numeral 10 indicates the tool which is cylindrical in general configuration. The tool 10 comprises an elongated sleeve 12 supporting a pressure plate 14 in turn supporting a pair of nut cutting chisels 16. The sleeve 12 is internally threaded from one end, as at 18, for cooperative engagement with the threads of a faucet stem 20 depending from a faucet, not shown. The faucet stem 20 projects downwardly through the flange 22 of a sink, or the like, with a faucet nut 24 threadedly engaged with the stem 20 sealing the faucet on the upper surface of the flange 22. The sleeve 12 is further characterized by an annular outstanding flange 26 adjacent its upper end portion. The upper end portion of the sleeve is diametrically reduced to define an annular upwardly facing shoulder 28 spaced a selected distance above the upper limit of the flange 26.

The disk-like pressure plate 14 is centrally bored to freely surround the diametrically reduced upper end portion of the sleeve. The pressure plate 14 is provided with an integral depending annular wall 30 rotatably surrounding and projecting downwardly below the lower limit of the sleeve flange 26.

Friction reducing means, such as a ball-type thrust bearing 32, interposed between the pressure plate 14 and sleeve flange 26, supports the pressure plate 14 for angular rotation of the sleeve 12 with respect to the pressure plate. In the example shown, the lower race 34 of the bearing 32 is supported by the upper surface of the sleeve flange 26 and the upper race 36 of the bearing is seated on the depending surface of the pressure plate 14 thus supporting the depending surface of the pressure plate in close spaced relation with respect to the sleeve shoulder.

Obviously, other type thrust bearings or friction reducing means may be provided permitting angular rotation of the sleeve relative to the pressure plate. For example, the pressure plate may be supported by the sleeve shoulder 28 or the flange 26 and a plastic material ring or rings, not shown, employed as friction reducing means.

Alternatively, the pressure plate may be supported by the sleeve in metal to metal contact and the coefficient of friction reduced by simply applying grease, or the like, to the relatively rotating surfaces.

Conventional keeper means, maintains the pressure plate and wall on the sleeve and flange, for example, the inner periphery of the depending end portion of the wall 30 is provided with an annular groove for receiving a snap ring 38 preventing separation of the pressure plate and bearing assembly from the sleeve.

The chisel means 16 each comprises a short length of cylindrical metallic material having a beveled or sharpened, preferably case hardened, edge 40. The other end portions of the chisels 16 are press fitted into cooperating sockets 42 formed in diametric opposition in the upper surface of the pressure plate 14 adjacent its bore. The cutting edges 40 of the chisels are preferably disposed in diametrically aligned relation. Lengthwise the chisels 16 are preferably relatively short in order to permit threaded engagement of the sleeve threads 18 on the faucet stem 20 when a relatively short faucet stem 20 is encountered. One of the chisels is preferably of slightly shorter length than the other, for the purpose presently explained.

The depending end of the sleeve 12 is closed and provided with a square, in transverse section, opening 44 dimensioned for receiving a ratchet wrench or ratchet tool extension, not shown, for angularly rotating the sleeve. The periphery of the depending end portion of the sleeve is preferably formed hexagonal to define wrench flats 46 for receiving a ratchet wrench nut socket, not shown.

Figure 3:
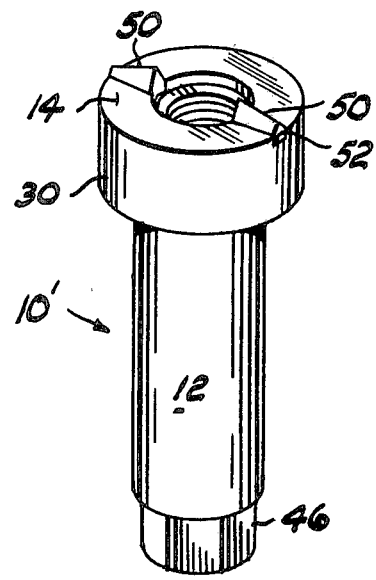
Figure 2:
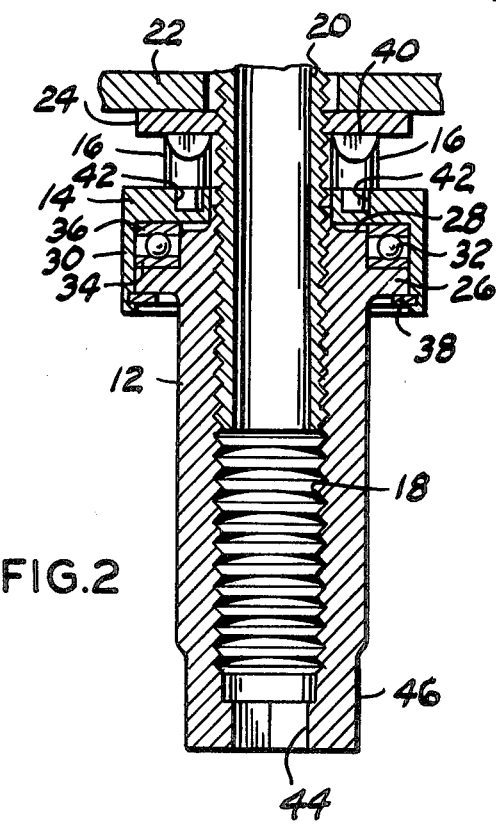
FIG. 2 is a vertical cross sectional view, to a larger scale, taken substantially along the line 2—2 of FIG. 1 and illustrating the relative position of the tool when in faucet nut splitting position; and, FIG. 3 is a view similar to FIG. 1 illustrating alternative nut splitting chisels.

The alternative embodiment 10', illustrated by FIG. 3, is substantially identical with the tool 10 with the exception of the nut splitting chisels 50, similarly radially disposed in diametric opposition on the surface of the pressure plate 14 within radial grooves 52 formed therein. The cutting edge of each of the chisels 50 diverge downwardly and outwardly from the periphery of the pressure plate bore.

OPERATION

In operation, assuming the water supply tubing and its components have been removed from the faucet stem 20, the tool 10 is progressively threadedly engaged with the depending end of the faucet stem. A wrench ratchet and a ratchet extension, if used, is inserted into the sleeve bottom opening 44 and the ratchet operated until the chisels 16 engage the faucet nut 24. Continued angular rotation of the sleeve 12, relative to the faucet stem, pressure plate and chisels, force the chisels into the nut and the longer chisel will cut through one side of the nut 24 which can ordinarily be heard, as a "pop", which is then followed by continued rotation of the sleeve, until the other chisel generates a "pop" as it cuts through the opposite side of the nut. The nut halves usually then fall off or can easily be removed. The tool 10 is then unscrewed from the faucet stem.

Obviously the invention is susceptible to changes or alterations without defeating its practicability. Therefore, I do not wish to be confined to the preferred embodiment shown in the drawings and described herein.

I claim:

1. A nut splitting tool for a faucet nut surrounding an intermediate portion of a vertically disposed faucet stem adjacent a sink flange, comprising:

an elongated sleeve threadedly surrounding said faucet stem below said faucet nut and having an annular outstanding flange adjacent one end portion forming a bearing surface facing said faucet nut;

a centrally bored pressure plate coaxially surrounding said faucet stem between said sleeve and said faucet nut and forming a bearing surface facing said annular flange;

an annular wall depending from said pressure plate adjacent the periphery of and projecting downwardly beyond said flange;

keeper means for maintaining said pressure plate on said sleeve;

a chisel-like cutter secured to said pressure plate opposite its bearing surface and having a radially disposed sharpened cutting edge facing said faucet nut;

friction reducing means interposed between said annular flange and said pressure plate for angular rotation of said sleeve relative to said faucet stem; and, wrench engaging means formed on the end portion of said sleeve opposite the annular flange.

2. The nut splitting tool according to claim 1 in which said friction reducing means comprises: a ball-type thrust bearing.

* * * * *